Figure 12:
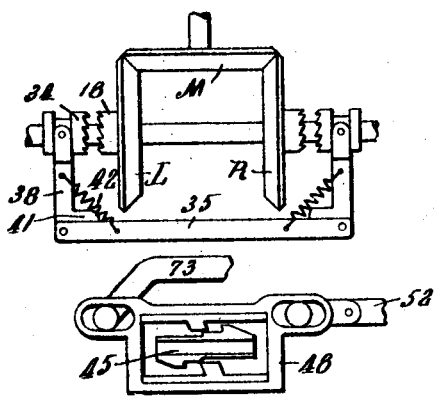

J. P. TARBOX.
AUTOMATIC BALANCING MECHANISM.
APPLICATION FILED JULY 31, 1911.
1,180,274.
Patented Apr. 18, 1916.
7 SHEETS—SHEET 1.
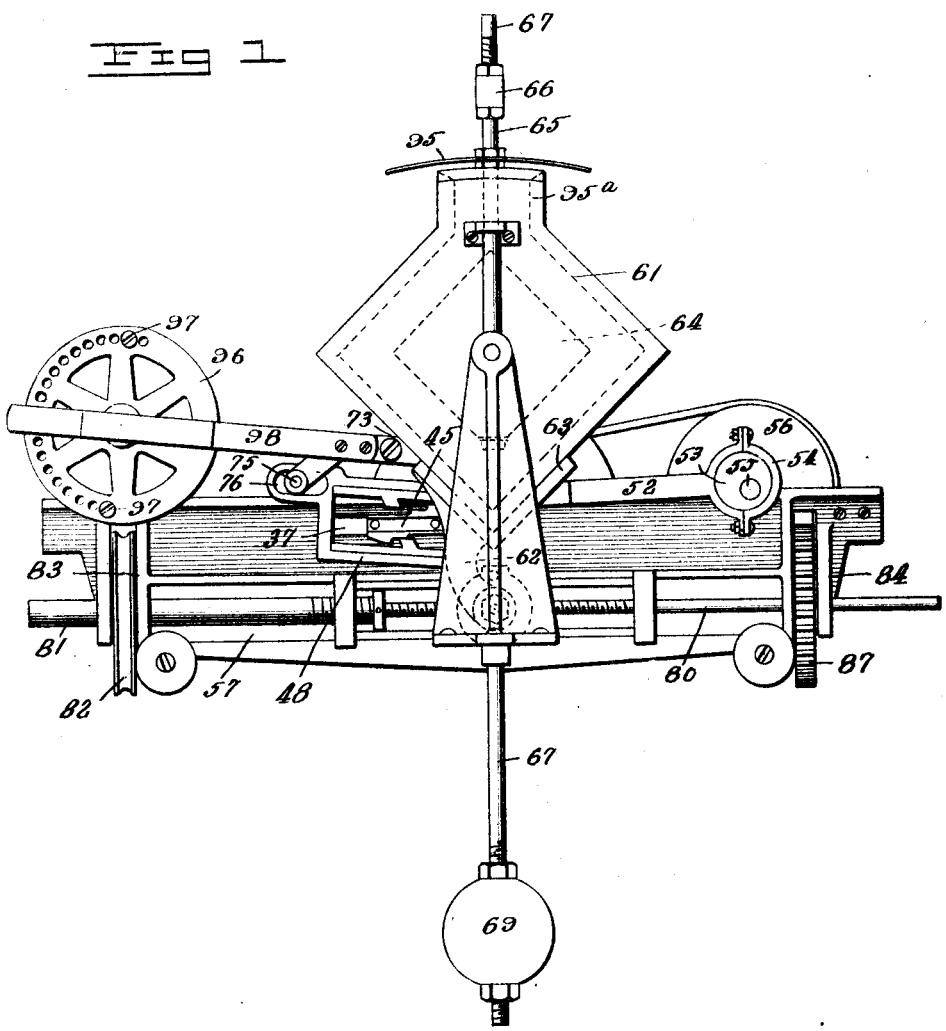

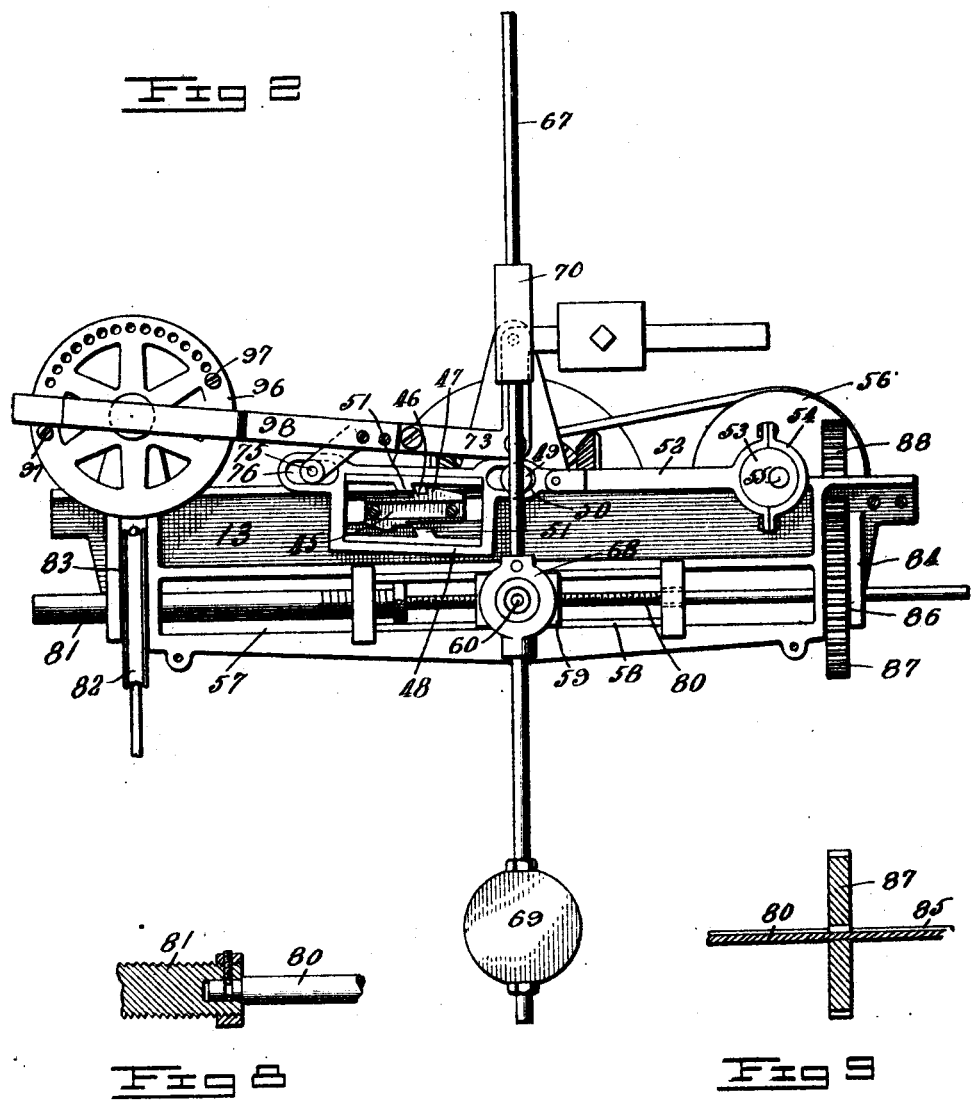

J. P. TARBOX.
AUTOMATIC BALANCING MECHANISM.
APPLICATION FILED JULY 31, 1911.
1,180,274.
Patented Apr. 18, 1916.
7 SHEETS—SHEET 3.
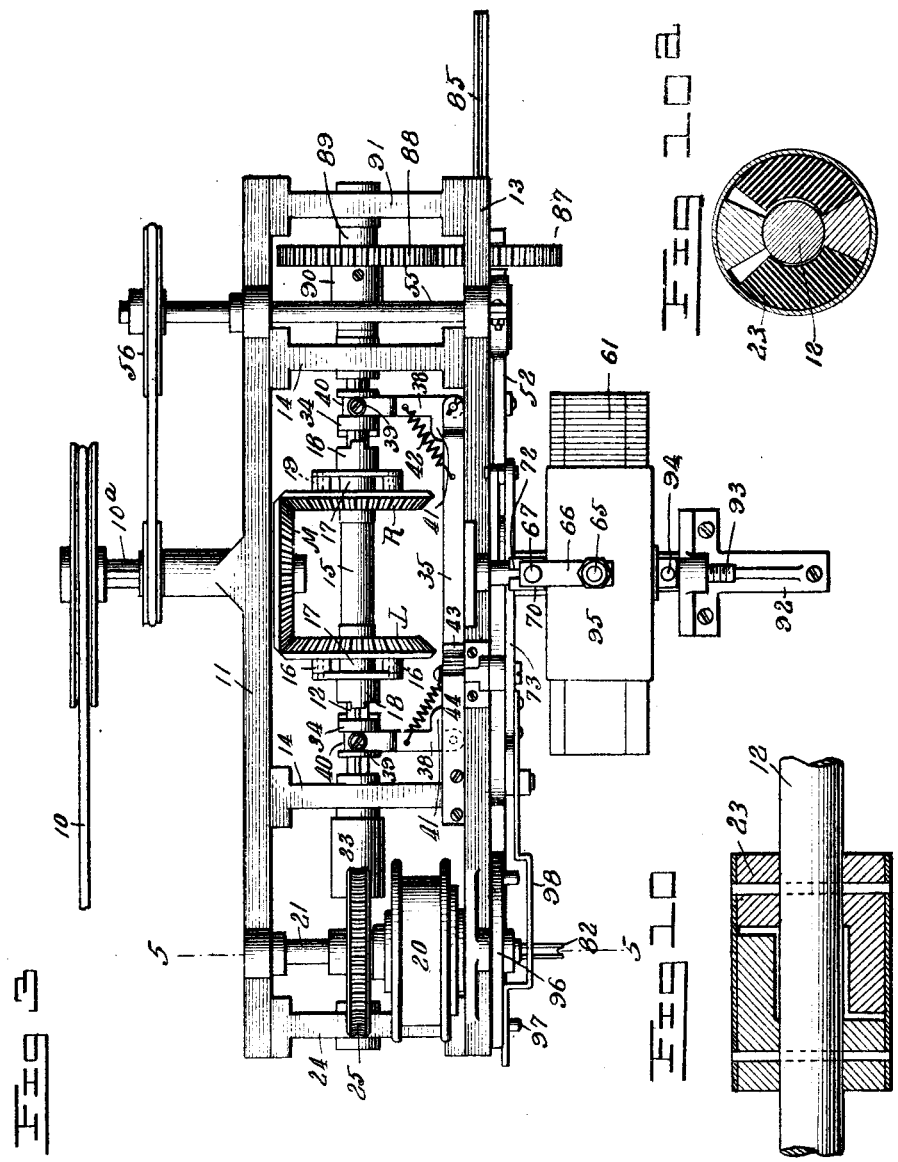

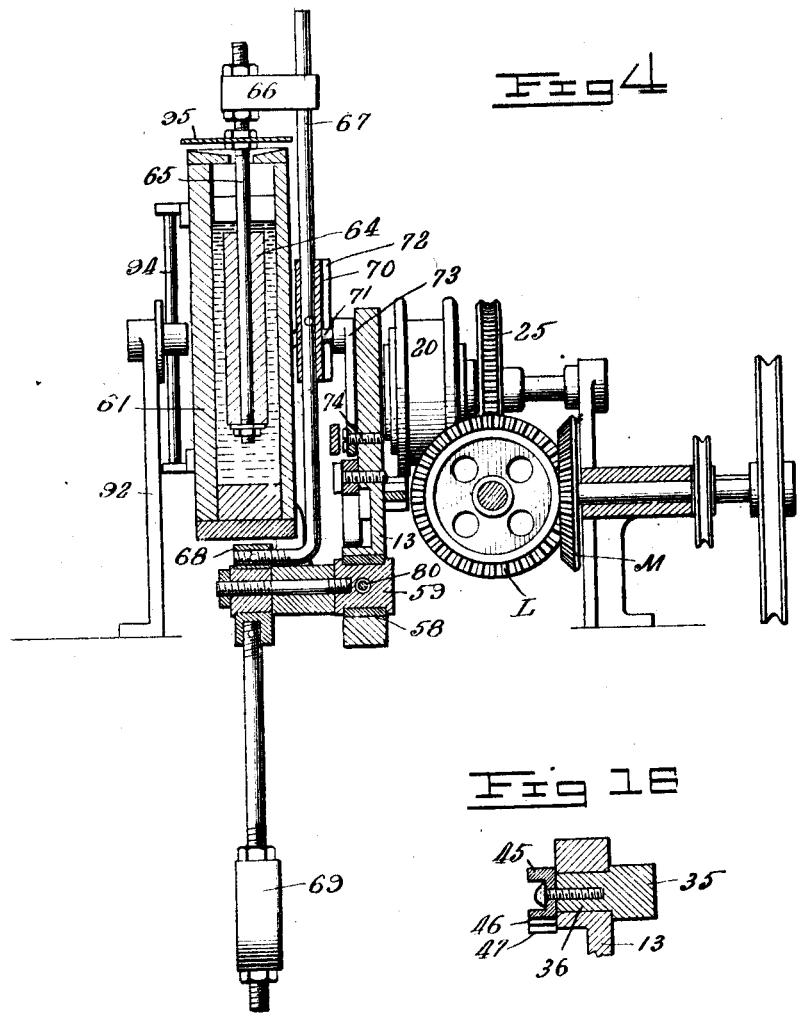

J. P. TARBOX.
AUTOMATIC BALANCING MECHANISM.
APPLICATION FILED JULY 31, 1911.
1,180,274.
Patented Apr. 18, 1916.
7 SHEETS—SHEET 5.
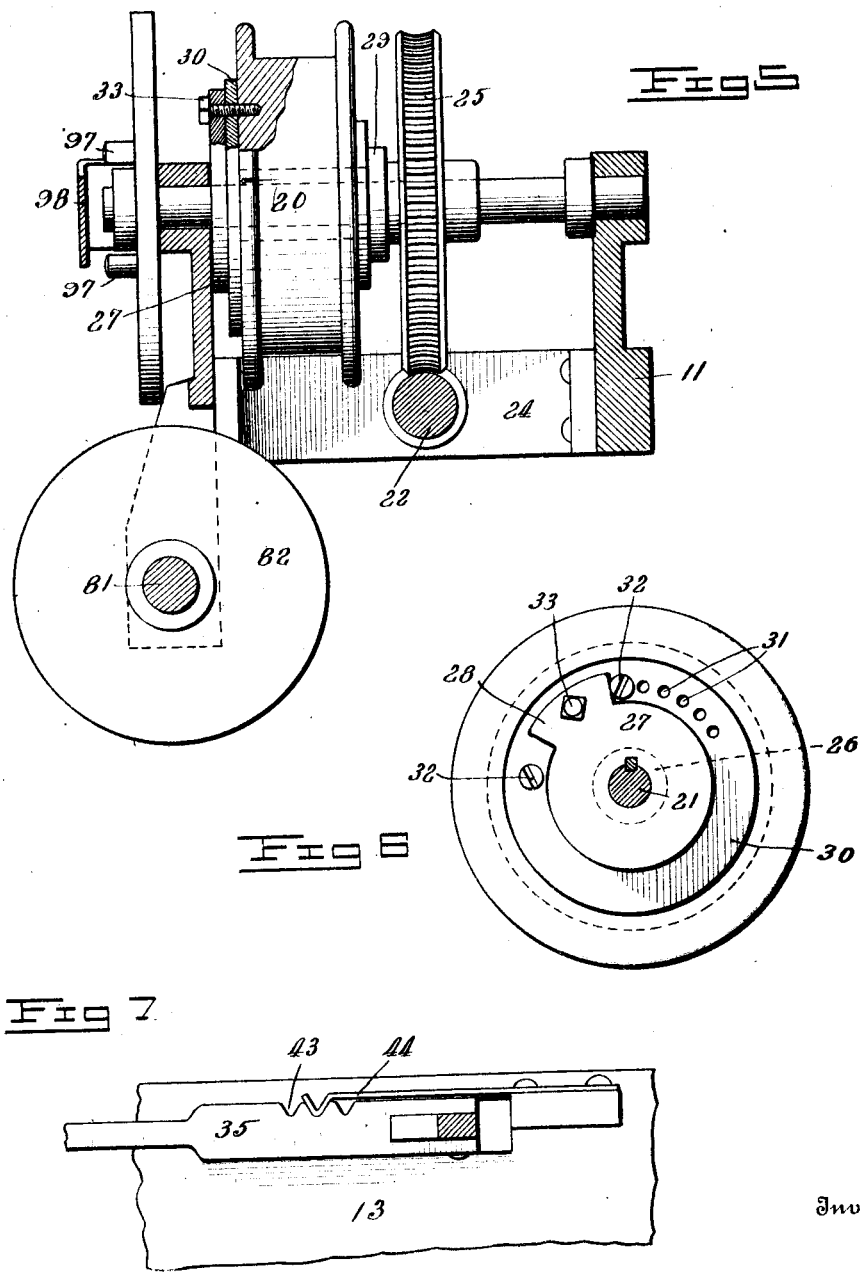

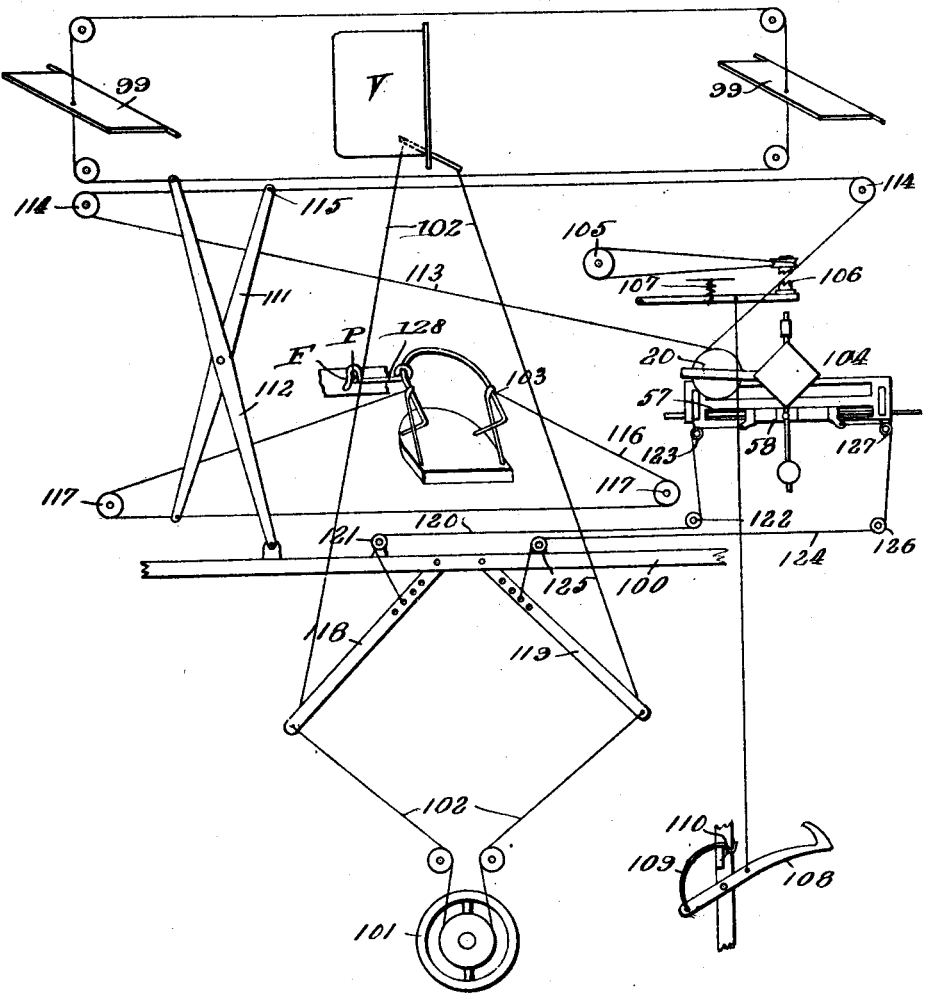

J. P. TARBOX.
AUTOMATIC BALANCING MECHANISM.
APPLICATION FILED JULY 31, 1911.

1,180,274.

Patented Apr. 18, 1916.
7 SHEETS—SHEET 7.

Witnesses
H. G. Robinette
A. L. Weaver

Inventor
John P. Tarbox

UNITED STATES PATENT OFFICE.

JOHN P. TARBOX, OF WASHINGTON, DISTRICT OF COLUMBIA, ASSIGNOR TO TARBOX SAFETY AIRCRAFT COMPANY, A CORPORATION OF DELAWARE.

AUTOMATIC BALANCING MECHANISM.

1,180,274.    Specification of Letters Patent.    Patented Apr. 18, 1916.

Application filed July 31, 1911. Serial No. 641,662.

*To all whom it may concern:*

Be it known that I, JOHN P. TARBOX, citizen of the United States, residing at Washington, in the District of Columbia, have invented certain new and useful Improvements in Automatic Balancing Mechanism, of which the following is a specification.

My present invention consists of an automatic balancing mechanism for air craft and is shown embodied in a balancing mechanism of what I term a mechanical type, though it may be embodied in any of the other types, such as the hydraulically operated, the electrically operated, compressed air operated, etc., and has already been embodied by me in some of them.

My invention has particularly to do with the standard of position, the connections between this standard and the source of power whereby the standard of position controls the movements of the operating devices for the balancing devices, and the control connections between the main body of the mechanism and the steering gear.

In order that a balancing mechanism shall operate satisfactorily on turns to balance an air craft at any given angle it is necessary that the standard of position be free from effects of centrifugal force acting to deflect the standard from its true position. In the new standard of position of my invention this is entirely obviated. The new standard has been found to be very efficient and reliable in operation.

The efficiency of the new standard of position is further increased by a specially devised mechanical relay through which a complete control of power is effected from a standard of position exerting only a very small force. This greatly diminishes the total weight of the mechanism.

By means of the special connections of the mechanism to the steering gear and balancing devices it is possible to exercise hand and automatic control independently of each other, or to exercise them conjointly. Thus one may be still used if the other should fail, and the automatic may be supplemented by hand control when desirable.

My invention comprises the combination of all the component parts in the efficiently operating whole, the parts themselves, the connection of the parts with, and their support from, each other.

In the accompanying drawings the mechanical embodiment afore mentioned is shown.

Figure 13:
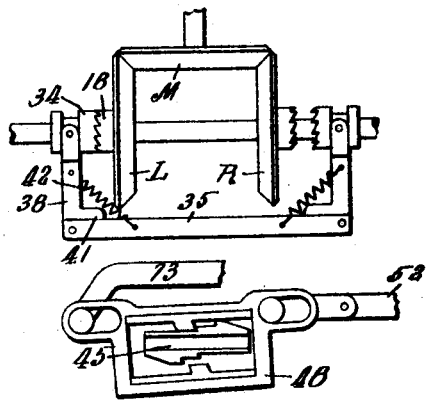
Figure 14:
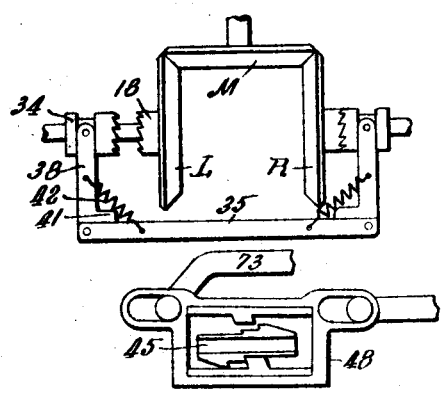
Figure 15:
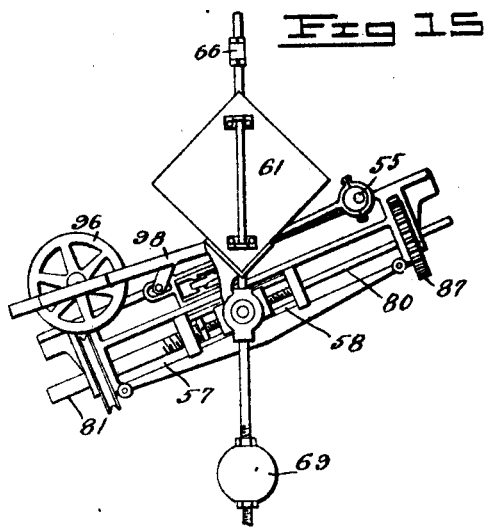

Figure 1 is a front elevation; Fig. 2 is a front elevation with a portion of the standard of position removed; Fig. 3 is a top plan view; Fig. 4 is a central transverse section; Fig. 5 is a transverse section on line 5—5 of Fig. 3, showing the operating device; Fig. 6 is a detail of the operating device of Fig. 5; Fig. 7 is a detail of the spring catch on the clutch bar; Fig. 8 is a detail of a bearing of the follow up device; Fig. 9 is a detail of a driving connection of the follow up device; Figs. 10 and 10ª are details of a special coupling used; Fig. 11 is a diagrammatic view of the mechanism showing the connection to the steering gear and balancing devices; Figs. 12 to 14 are diagrams showing various positions of the power control devices of the mechanism; Fig. 15 is a reduced front elevation of the mechanism showing the movement of the standard of position; Fig. 16 is a section through the clutch bar and adjoining frame showing its connection to the relay block.

The new mechanism is power driven from the engine of the air craft. The source of power of the mechanism comprises three miter gears M, L and R, the middle one of which M, is continuously driven by belt 10 or other power source, from the engine, or any other suitable drive, the gear M driving the two gears L and R continuously in opposite directions. The gear M is journaled transversely of the back 11 of the main frame, while the gears L and R are journaled on the main shaft 12, in turn journaled between the back 11 and front 13 of the main frame in cross bars 14. The gears L and R are spaced apart on the shaft 12 by means of a sleeve 15 surrounding the shaft. Each gear is provided on the outside with two spaced lugs 16 diametrically opposite. Positioning collars 17 for the gears are fixed to the shaft between the lugs 16 while clutch members 18 one for each gear L and R are freely journaled on the shaft, and secured to the lugs 16 by means of bolts 19. Thus the clutch members 18 rotate with the gears L and R and are fixed in position on the main shaft 12.

At one end the frame carries the operating drum 20 supported on a shaft 21 journaled transversely of the frame. To this drum the operating connections to the balancing devices are made (see Fig. 11). The drum is arranged to be driven by the shaft 12. A worm 22 is connected to shaft 12 by a yielding shock absorbing coupling 23 (see details Figs. 10 and 10ª) and journaled at its outer end in cross bar 24 at the outer end of the frame. This worm meshes with worm gear 25 on shaft 21.

The drum 20 is peculiarly connected to this shaft (see Figs. 5 and 6). A hub 26 having a flange 27, provided with a lug 28 is fixed to the shaft. The drum is freely journaled on this hub being confined against the flange 27 by means of a confining collar 29. On its face adjacent the flange the drum has a screw plate 30 in which are spaced tapped holes 31 on the arc of a circle. Two pins 32 are screwed in these holes, and are adapted to engage one on one side of the lug 28 and one on the other. By adjusting pins 32 to any desired hole, any desired amount of lost motion may be introduced between the shaft 21 and balancing devices connected with the drum 20. By means of a bolt 33 passing through the lug 28 and plate 30 all lost motion may be eliminated. In fact, if the spacing of the holes 31 is exact, lost motion may be eliminated by placing pins 32 each immediately adjacent lug 28.

Now by the provision of clutch members 34 coöperating with members 18 and splined to shaft 12, the shaft 12 and hence the operating drum 20 may be rotated in one direction or the other by simply clutching shaft 12 to one or the other of gears L and R. Thus the balancing devices are moved in one direction or the other, up or down. A clutch bar 35 is supported on the inside of the frame front 13, being provided with a long lug 36 projecting through a longer slot 37 in the frame. At each of its opposite ends the bar 35 carries a clutch arm 38, the arms being pivoted to the bar and carrying rollers 39 at their outer ends bearing in grooves 40 in shiftable clutch members 34. The clutch arms 38 each have an inwardly projecting foot 41 normally bearing on the inner side of the clutch bar and springs 42 bias the arms to this position. By shifting the clutch bar 35 right or left one clutch 34—18 is yieldingly thrown in, while the other is positively thrown out. By the provision of three notches 43 (see Fig. 7) in the top of bar 35 and a holding spring 44 fixed to the frame and having an end engaging one notch at a time, the bar is given three distinct positions, to wit, one in which neither clutch 34—18 is in, one in which one only is in, and one in which the other only is in (see Figs. 12—14).

Secured to the front of the lug 36 on bar 35 and on the front of the frame is a relay block 45 provided on each of its top and bottom sides with two relay teeth 46 and 47. Surrounding this block is a rectangular relay frame 48 pivoted by a pin and slot connection 49—50 at one end, and movable about this pivot. Above and below block 45 on the inside of the frame are secured relay claws 51, adapted to engage the teeth 46 and 47 on the relay block 45. The frame 48 is connected by eccentric rod, eccentric and strap 52, 53, 54, with transverse shaft 55 for continuous reciprocation, the shaft 55 being continuously rotated by a gear connection 56 with drive shaft 10ª. As shown in Figs. 12—14, by movement of the relay frame 45 up or down, the claws 51 are caused to engage the coöperating teeth 46, 47, and the clutches are shifted by power into or out of engagement. Very little power is required to shift the reciprocating frame 48 as compared with the clutches 34, 18, and the connected bar 35.

A study of the diagrams of Figs. 12 to 14, will show that the teeth 46 of the block 45 are throw-in teeth, because when the frame 48 is moved to an extreme position either down or up these teeth 46 are engaged by the claws 51 and one clutch thrown in. Further, the teeth 47 are throw-out teeth. When the frame 48 is moved to an intermediate position, one of the teeth 47 is thrown out. Assuming a given clutch is in, a given tooth 46 having been engaged by a given claw 51 (see Fig. 13), then when the frame 48 is moved back to an intermediate position (see Fig. 12) the tooth 47 on the side opposite from the given tooth 46 is engaged, this releasing the given clutch. Several points are to be particularly noted about these teeth 46, 47 of block 45 and claws 51.

First, both teeth and claws are undercut on their front edges, the angle of the undercut approximating 60°. This insures a positive engagement, the points of the claws 51 sliding downwardly in the undercut of the teeth promptly they engage the points of the teeth. This avoids breaking of the points, and secures reliability.

Secondly, the throw-out teeth 47 are longer than the throw-in teeth 46 and have a concave undercut. This length insures immediate throw-out upon movement of the frame, while the concaving and the length prevent the claws from immediately engaging the teeth 46 after a throw-out of a clutch. The interval between actions may be made anything desirable by changing the length of these teeth.

Thirdly, the claws 51 on the frame just clear the respective throw-out teeth when the relay frame is in throw-in position (Figs. 13 and 14).

Fourthly, the stroke of reciprocation of the frame is much greater than the distance between the points of adjacent teeth 46 and 47. The greater the length of stroke the more reliable the active engagement of the teeth and claws, there being in longer strokes a longer interval when the claws 51 clear the teeth 46 and 47.

This relay is moved by the new standard of position. This comprises what may be called a floating pendulum. It comprises a combination of floats and weights. The buoyant force of a liquid on a float acts in direct opposition to gravitational force, and if the float is submerged, this buoyant force is always perpendicular to the surface of the earth, there being no deflection due to surface irregularity.

In the bottom of the front 13 of the main frame is a long slot 57, and mounted to slide in the slot is a link frame 58. Mounted within the link 58 is a pivot block 59, all of this construction being similar to that described in my co-pending application. A pivot pin 60 projects forwardly from the block. This pivot supports the standard of position.

61 is a rectangular tank supported by the pivot pin 60 on a bracket 62, the lower end of the bracket being journaled on the inner end of the pin, and the upper end being offset forwardly and provided with a trough 63 supporting the tank by one of its corners. Normally the tank is supported as shown in Fig. 1, the diagonal from the supported corner of the tank being vertical. The tank is all closed save for the top diagonally opposite its support. A rectangular float 64 is submerged or substantially so in mercury within the tank and connects by a rod 65 adjustably with a cross bar 66 connected to pendulum rod 67. The pendulum rod extends between the tank 61 and the front of the frame downwardly substantially parallel with the float rod 65 to the hub of bracket 62 where it is turned forwardly to a pivot hub 68 on the front end of pin 60, the bracket 62 being offset laterally (see Fig. 1) to permit this. Thereby the pivot of the pendulum rod 67 is positioned in a right line with the float 64, that is, in the line of the upward buoying thrust on the float. This avoids lateral deflection of the pendulum rod 67. The pendulum rod is extended downwardly from the pivot hub and supports at its lower end a weight 69. This weight is such that it exactly counterbalances the weight of the float 64 and other parts connected with the pendulum rod above the pivot 60. In other words, the total mass M on and of the rod 67 below the pivot multiplied by the length L to the center of gravity below the pivot, is made to equal the total mass M' on and of the rod above the pivot multiplied by the length L' to the center of gravity above the pivot. Thus all the lateral forces acting simultaneously to the same degree on both ends of the pendulum neutralize each other at the pivot 60.

Such a force is centrifugal force acting when an air craft is making a turn. Its effect on the standard of position is nil, and the buoyant force of the liquid in the tank maintains it in its true vertical position. So also forces of inertia on the standard are neutralized. A number of actual flights made with an aeroplane equipped with this invention has established these facts.

On the upper end of the pendulum rod 67 is fixed a block 70 connecting by the pin and slot connection 71—72 with the upper end of a bell crank lever 73 pivoted at 74 on the frame 13. The opposite end of this lever connects by pin and slot connection 75—76 with one end of the relay frame 48. Thus when the air craft on which this mechanism is installed shifts its position, the relay frame 48 is shifted by the pendulum and power connections are made to operate the balancing devices.

A follow-up device is provided for the purpose of securing a movement of the balancing devices which is proportional approximately to the angle of list, and which is in phase approximately with the deflexing of the craft at all times. The pivot block 59 is threaded on screw 80 fixedly journaled in the opposite ends of link 58. At one end the journal comprises a shaft 81 of larger size than screw 80 threaded into the end of link 58 (See Fig. 8) so that when the shaft 81 is turned the shaft 80 with the pivot block 60 may be moved longitudinally. A hand wheel 82 splined on shaft 81 and fixed in the pocket 83 in the frame is a ready means of turning this shaft. The opposite end of shaft 80 passes through a clean hole in the corresponding end of the link (see Fig. 2) and out through bearing 84 from the end of frame 13. There is a long keyway 85 in the end of the shaft which is not screw threaded beyond link 58. Splined on this end of shaft 80 and fixed in pocket 86 is a gear 87 meshing with gear 88 on extension shaft 89 connected with the main shaft 12 by yielding shock absorbing coupling 90 similar to the coupling shown in Figs. 10 and 10ª, the shaft 89 having an outward bearing in cross bar 91. Thus when the shaft 12 and drum 20 are moved, the pivot of the standard of position is moved, thus moving the whole standard including the tank and giving it a new position with respect to the fixed frame of the mechanism. In order to permit this movement, and at the same time support the tank, a fixed bracket 92 is mounted in front of and adjacent to the tank and carries a swiveled bolt 93 at the point directly opposite the pin 71 on the upper end of bell crank lever 73. A vertically extending rod 94 secured to but spaced away from the tank, has a sliding connection with this bolt.

The tank is provided at its top with an upwardly extended neck having a slot through which the float rod extends, the mouth of the slot being sloped inwardly, (see Fig. 4). Secured to the top of the pendulum rod 67 is a cover plate 95 curved on an arc of a circle about pivot 60, and overlying the correspondingly curved mouth of the tank, but spaced away from it slightly. By means of the neck, mouth and cover constructed in this manner all loss of liquid through splashing is avoided and yet free movement of the pendulum is not interfered with.

On the shaft 21 with the operating drum 20 is a limit wheel 96 carrying adjustable limit stops 97. The relay lever 76 carries an extension bar 98 which overlies the face of wheel 96, being offset just before it reaches the inner edge of the wheel (see Fig. 3), and then passing beyond the hub of the wheel and there being inset adjacent the face of the wheel and passing around its outer edge to the rear. Thus is the bar 98 engaged by the stops 97 on the outer edge of the limit wheel, and not on the inner edge, thereby obtaining a more gradual movement of the relay frame than if the stop engaged on the inner side of the limit wheel. Upon a predetermined movement of the drum 20 and the balancing devices, the limit stops operate the relay frame 48 through bar 98 to cause the operating drum 20 to be unclutched from the main shaft 12.

The main body of the mechanism as thus embodied is associated with special connections to the steering gear and balancing devices of the air craft. This is shown in Fig. 11, in which figure the mechanism is shown diagrammatically as applied to a Curtiss type aeroplane.

99—99 are the right and left ailerons, 100 is the lower front, or any other suitable beam of the plane, and 101 is the steering wheel connected by cables 102 to the rear vertical rudder V for steering right and left. 103 are the shoulder forks connected usually directly with the ailerons. 104 is the mechanism previously described, which mechanism is geared to the engine or other source of power 105 through power controlling means in the form of clutch 106 biased inwardly at all times by spring 107, but operable to the off position by foot lever 108 pivoted to a convenient fixed part of the aeroplane and provided with a spring catch 109—110 for holding the lever in off position as shown. Thus the mechanism may be thrown in and out of operative connection with the source of power. The mechanism may be fixed in position at any convenient point.

111—112 are a pair of scissors levers pivoted to each other and connected one of them at its lower end to the beam 100 by a pivotal joint. Although these levers are shown diagrammatically, it should be borne in mind that in practice the levers in their normal position coincide, and moreover that they are substantially of the same length. A cable connection 113 passes over idlers 114 and over the drum 20 of the mechanism. This cable connects at 115 with the upper end of lever 111. A cable 116 passes from the shoulder forks 103 over idlers 117, connecting with the opposite end of lever 111 from the end 115. The connecting cables are of considerable length as is well known, and moreover contain a little slack, so that the free movement of the levers about their pivotal centers during the operation of the balancing mechanism is not disturbed in any way. Of course the length of the levers is made such that the arcs of movement of their ends are of large radius and not too abrupt. Thus the balancing devices in the form of the ailerons 99—99 may be operated either from the automatic mechanism or from the manual control forks.

Pivoted to a fixed part of the aeroplane such as the beam 100 are two diverging levers 118—119, the outer ends of which connect with the steering cables 102 extending to the rear vertical rudder. A cable 120 passes over a pulley 121 from lever 118 and over pulleys 122—123 to the link 58 of the mechanism, while a second cable 124 passes from lever 119 over pulleys 125—126—127 to the opposite end of link 58. Thus whenever the steering wheel is moved to change the course of the air craft, the link 58 is moved along its slot 57, carrying with it the pivot 60 of the standard of position, and giving the standard a new vertical position with respect to the remainder of the mechanism and the air craft on which it is mounted.

With this understanding of the structural embodiment of my invention, its operation, and the principles which govern that operation can be readily understood.

Referring to Figs. 1, 2, 3 and 11, and first particularly to Fig. 11, and assuming that the air craft on which the mechanism is fixed, lists to the left, then the relay frame 48 is moved upwardly by the float 64 of the standard of position through the bell crank lever 73. This results in the clutch bar 35 being thrown to the left as shown diagrammatically in Fig. 14, thus connecting the main shaft 12 to the miter gear R. The main shaft is therefore rotated, in turn rotating the operating drum 20, and operating the balancing devices 99—99 to correct the list. If the list were to the right instead of to the left, the relay frame 45 would be moved downwardly through lever 73, with the result shown in Fig. 13, in which the main shaft 12 is clutched to the left hand miter gear L. Therefore the drum 20 is moved in the opposite direction from that in which it was moved when shaft 12 was clutched to gear R on a list to the left. Therefore the balancing devices 99—99 are moved in the opposite direction to correct the right hand list. In either case as soon as the balancing devices are set in motion, the follow up device comprising gears 87—88 and screw 80 journaled in frame 58, act by rotation of the screw 80 to shift the pivot 60 of the standard of position in the direction of the list as shown in Fig. 15, the link 58 being meanwhile held stationary through its connection with the steering cables 102 which are not moved usually except when it is desired to turn the craft. Thus the pendulum standard of position is given a new position with respect to the transverse axis of the craft, being moved farther down grade in the direction of list, the farther the list. The mechanism is operated preferably at such speed that the movement given the balancing devices is proportionally greater in rate than the movement of the air craft, with the result that when the list is maximum, the deflection of the balancing devices is maximum, and the pendulum has been moved toward the low side and again to a vertical position by the follow up device 87—88, in which position the balancing devices are held stationary, the shaft 12 being unclutched from both of the gears L and R as shown clearly in Fig. 12.

Again considering the list to the left, and the mechanism shown in Fig. 15, promptly the air craft begins to recover itself, the relay frame 45 is moved downwardly to the position shown in Fig. 13, which it will be remembered is the same position to which the frame is moved when the list is to the right. Therefore the shaft 12 is clutched to the miter gear L, and the balancing devices 99—99 moved in the opposite direction and returned to their normal position simultaneously with the return of the craft to normal position. Simultaneously also the pivot 60 of the pendulum has been moved up grade and returned to its normal central position. Promptly upon the reaching of normal position by the craft, the relay frame 45 is returned by the pendulum to the position of Fig. 12. There is thus no oscillation of the craft or mechanism, there being a definite deflection of the balancing devices for each definite list angle, and a definite and simultaneous return of the balancing devices to normal with the return of the craft to that position. What holds good for list to the left, also holds good for list to the right. During these movements, the balancing devices are operated through the scissors 111—112 which constitute a differential connection. While the automatic mechanism is acting alone, the lever 111 is moved by cable 113 about its lower end which is connected to a cable 116 as a pivot. Its movement is transmitted directly to lever 112 connected with the balancing devices. When the manual control is exercised, the lower end of lever 111 is moved, movement taking place about point 115 as a pivot and the motion being also directly communicated to lever 112. Manual and automatic control may thus be exercised conjointly or independently. A latch 128 comprising a hook pivoted on a shoulder yoke and hooking over a pin P on a fixed part F is provided for locking the shoulder forks 123 of the manual control in position, while the automatic mechanism may be readily clutched and unclutched by means of the foot lever 108. The clutch is positively disengaged by operation of the foot lever 108, being held in disengaged position by means of the spring latch 109. It may be again thrown in by simply tripping the end of the latch 109 from the point of catch 110. Now when the steering wheel is moved to right or left for the purpose of making a turn, the link 58, and hence the pivot of the pendulum are moved in the direction of the turn. That is, assuming a turn to the left, the link 58, is moved to the left, or down grade in the direction of the list which ensues. Thus the standard of position is given a new normal position with respect to the fixed main body of the mechanism all as described in my co-pending application Serial Number 607,736. Therefore the craft is listed to a predetermined angle as defined by this new position of the standard. Thereafter the craft is balanced at this new angle in the same manner as it was balanced in the horizontal while going straight away. The maximum angle of list permissible for a given turn is determined by the maximum deflection of the balancing devices necessary to stabilize the craft at that angle, the balancing devices automatically being brought to rest in a position which counteracts the unbalancing force due to the greater speed of the air craft on the outward side. For each degree of turning there is, due to the proportional shifting of the block 58, a defined angle of list. For great circles this is smaller while for smaller circles this is larger.

By means of the adjustable limit stops 97 the maximum deflection of the balancing devices, which should be at their point of maximum efficiency, may be determined.

While this embodiment of my invention has been described in connection with lateral balancing devices, it is patent that it may be used with equal facility in connection with fore and aft balancing devices. Through the use of two of these devices connected one to the lateral balancing devices, and one to the fore and aft balancing devices, the operator of an air craft is relieved from the operation of two of the three controls which he now exercises, leaving him with only one, which one is most easily operated by any person.

While I have described the best form of my invention now known to me, it is evident that my invention may be given many modified forms without departing in any wise from its generic spirit. I desire to cover in the annexed claims all such modified forms of my invention.

What I claim is:—

1. A standard of position for aircraft capable of assuming a plurality of control positions as respects the plane of the craft to effect different angles of balance thereof and comprising a float member having a pivotal connection with the craft, floating within a buoying medium, and exerting a controlling force in opposition to the effect of gravity upon its mass, counterbalancing means connected with the float member but lying on the opposite side of the pivot thereof from the float member and of a value sufficient at least to counteract the effect on the mass of the float member of forces transmitted thereto through the pivot thereof, a steering means for the craft, operating means for the same, and connections between said operating means and the said standard of position arranged to effect a shifting of the standard from one position to another to change the normal balancing angle of the same when the steering means is operated.

2. A standard of position for governing the balancing devices of aircraft capable of assuming a plurality of control positions as respects the plane of the craft to effect different angles of balance thereof and comprising a float member having a pivotal connection with the craft, floating in a buoying medium, and exerting a controlling force in opposition to the effect of gravity on its mass, counterbalancing means connected with said float but lying on the opposite side of the pivot thereof from the float member and of a value at least sufficient to counteract the effect on the mass of the float member of forces transmitted thereto through the pivot thereof, balancing devices for the craft, operating means therefor, a source of power, power controlling means operated by the said standard of position and controlling the transmission of power from said source to said operating means, a steering means for the craft, operating means therefor, and connections arranged to effect a shifting of the standard from one position to another to change the normal balancing angle of the said standard when the steering means is operated.

3. An automatic balancing mechanism comprising a source of power, an operating device for balancing devices, a standard of position controlling the application of power to said operating devices, said standard comprising a float, a tank of liquid exerting a buoyant force on said float, and means for shifting said tank in accordance with the position of said float.

4. An automatic balancing mechanism comprising a source of power, operating means for balancing devices, a standard of position controlling the application of power to said operating means, said standard comprising a float, a housing therefor containing a buoying medium for said float, and means for shifting the housing in accordance with the position of the float.

5. An automatic balancing mechanism comprising a source of power, an operating device for balancing devices, a standard of position controlling the application of power to said operating devices, and comprising a float and a tank of liquid exerting a buoyant force on the same, a common pivot for the float and tank and a follow up device for moving the pivot to shift the position of the standard as the balancing devices are operated.

6. An automatic balancing mechanism comprising a source of power, an operating device for balancing devices, a standard of position controlling the application of power to said operating devices, and comprising a float and a tank of liquid exerting a buoyant force on the same, a common pivot for the float and tank, a follow up device for moving the pivot to shift the position of the standard as the balancing devices are operated, and means maintaining the tank upright.

7. An automatic balancing mechanism comprising a source of power, an operating device for balancing devices, a standard of position controlling the application of power to said operating devices, and comprising a float and a tank of liquid exerting a buoyant force on the same, a common pivot for the float and tank, a follow up device for moving the pivot to shift the position of the standard as the balancing devices are operated, a control connection to the float, and a supporting connection to the tank directly opposite said control connection.

8. An automatic balancing mechanism comprising a source of power, an operating device for balancing devices, a standard of position controlling the application of power to said operating device, said standard comprising a float member, a housing inclosing the same and containing a buoying medium, a common pivot for the float and the housing, a follow up device for shifting the housing to shift the position of the standard as the balancing devices are operated, a control connection to the float, and a supporting connection to the housing directly opposite said control connection.

9. A standard of position for aircraft comprising a float member, a movably mounted tank of liquid within which the said member is floated, a pivotal connection fixing the center of movement of the float, a control mechanism connection from the float, and a supporting connection for the tank directly opposite said control mechanism connection.

10. An automatic balancing mechanism comprising a source of power, an operating device for balancing devices, a standard of position controlling the application of power to said operating devices, and comprising a float and a tank of liquid exerting a buoyant force on the same, a common pivot for the float and tank, a follow up device for moving the pivot to shift the position of the standard as the balancing devices are operated, a pin and slot control connection to the float, and a pin and slot supporting connection to the tank directly opposite said operating connection.

11. In an air craft, an automatic balancing mechanism comprising a source of power, operating means for the balancing devices, a standard of position comprising a float and a tank of liquid exerting a buoyant force on the same, steering connections for the vertical rudders of the craft, and connections from the steering gear to the tank whereby the tank is moved at the same time that the vertical rudders are moved.

12. In an air craft, an automatic balancing mechanim comprising a source of power, operating means for the balancing devices, a standard of position comprising a float and a tank of liquid exerting a buoyant force on the same, and a common pivotal support for said tank and float, said tank being supported from the inner end of said pivot, and said float from the outer end.

13. In an air craft, an automatic balancing mechanism comprising a source of power, operating means for the balancing devices, a standard of position comprising a float and a tank of liquid exerting a buoyant force on the same, and a common pivotal support for said tank and float, said tank being supported from the inner end of said pivot, and said float from the outer end, and the said tank, float and float pivot being in the same right line.

14. A standard of position for aircraft comprising a float member, a housing for the same containing a buoying medium, and a pivotal support for said float, said housing, float, and float pivot being in the same right line.

15. In an air craft, an automatic balancing mechanism comprising a source of power, operating means for the balancing devices, a standard of position comprising a float and a tank of liquid exerting a buoyant force on the same, and a pivotal support for said float, said tank, float and float pivot being in the same right line.

16. An automatic balancing mechanism comprising a source of power, operating means for balancing devices, power controlling means directly controlling the transmission of power to said operating means, a standard of position for causing operation of said power controlling means to apply power to the operating means, and a mechanical relay between the standard and the said power controlling means through which the standard of position controls the movement of the power controlling means.

17. A mechanism of the character described comprising a pair of spaced frame members, a main shaft journaled between the frame members, oppositely driven driving gears journaled on said shaft, clutches on said shaft by which either of said gears may be clutched to said shaft, a clutch shifting bar on the inside of the front one of said frame members, a projection from said bar through the frame member, a relay block on said projection, a reciprocating relay frame coöperating with said block, a standard of position controlling the position of said relay frame, and operating means for balancing devices connected with the said main shaft.

18. In an air craft, an automatic balancing mechanism comprising a source of power, operating means for balancing devices, and a standard of position controlling the application of power to said balancing devices, balancing devices for said craft, a lost motion connection between said balancing devices and said source of power, and means for eliminating said lost motion at will.

19. A balancing system for air craft, comprising a power operated automatically operating balancing mechanism including a source of power, operating means for balancing devices, power controlling means to control the continuity and direction of the transmission of power from said source to said operating means, and a standard of position governing the said power controlling means, manually operable means for controlling balancing devices, balancing devices for the craft, and a three point differential connection between the balancing devices on the one hand, and the operating means of the power operated automatic balancing mechanism aforesaid, and the aforesaid manually operable controlling means on the other hand.

20. In an air craft, a balancing system comprising an automatic balancing mechanism including a source of power, operating means adapted to be moved from said source of power to operate said balancing devices, a standard of position controlling the application of power from said source to said operating means, said operating means being normally positively locked in any position to which it is moved in response to the governing action of said standard of position, balancing devices for the air craft, manually operable controlling means for said balancing devices, and a three point differential connection between said balancing devices on the one hand, and said operating mechanism of the automatic device and said manually operable control devices on the other, whereby operation of the balancing devices through said manual controlling means is ithout effect upon the position of said operating means of the automatic mechanism.

21. In an air craft, a balancing system comprising an automatic balancing mechanism including a source of power, operating means adapted to be moved from said source of power to operate said balancing devices, a standard of position controlling the application of power from said source to said operating means, said operating means being normally positively locked in any position to which it is moved in response to the governing action of said standard of position, balancing devices for the air craft, manually operable controlling means for said balancing devices, and a three point differential connection between said balancing devices on the one hand, and said operating mechanism of the automatic device and said manually operable control devices on the other, and means for locking the manual control at will, whereby the manual control and the automatic control may each operate independently and positively without affecting the other and whereby the movement of the balancing devices in all cases is proportional exactly to the movement of that one of the manual and automatic controls which is exercised.

22. A balancing system for air craft comprising an automatic means including a source of power, operating means for balancing devices adapted to be driven from said source of power, a standard of position governing the application of power from said source to said operating means, balancing devices for the craft, manually operable controlling means for said balancing devices, a vertical rudder and manual means for controlling the same, connection from said last named manually operable controlling means to said automatic mechanism adapted to effect the change in the normal balancing angle of said mechanism when said vertical rudder is operated, and a differential connection between the balancing devices on the one hand, and said operating means of the automatic mechanism and said first named manual control on the other.

23. A balancing system for air craft comprising an automatic means including a source of power, operating means for balancing devices adapted to be driven from said source of power, a standard of position governing the application of power from said source to said operating means, balancing devices for the craft, manually operable controlling means for said balancing devices, a vertical rudder and manual means for controlling the same, connection from said last named manually operable controlling means to said automatic mechanism adapted to effect the change in the normal balancing angle of said mechanism when said vertical rudder is operated, a differential connection between the balancing devices on the one hand, and said operating means of the automatic mechanism and said first named manual control on the other, and means for locking the manual control of the balancing devices independently of the manual control for the said vertical rudder.

24. In a balancing system for air craft comprising an automatic balancing mechanism including a source of power, operating means for balancing devices adapted to be driven from said source of power, a standard of position governing the application of power to said operating means from said source, said operating means being adapted to remain locked in any position to which it is moved in response to the governing action of said standard of position, and thereby retain the balancing devices in the positions to which they are operated, balancing devices connected with said operating means, manually operable control means also adapted to operate said balancing devices, and a clutch device for cutting off said source of power and terminating the operation of said automatic mechanism at will, together with means whereby said clutch device may be operated from a point adjacent said manually operable controlling means.

25. In an air craft, balancing devices, manual control means for the same, automatic control means for the same, a pair of scissors levers, one end of one of which is pivoted to a fixed point, connections from the opposite end of said one lever to the balancing devices and connections from one end of the other lever to the automatic control device and from the other end of the said other lever to the manual control device.

26. An automatic balancing mechanism comprising a source of power, operating means for balancing devices, power control means adapted to be shifted to effect the transmission of power to said operating means in one direction or another, a mechanical relay connected with said power controlling means and driven from said source of power to shift said controlling means, and a standard of position governing the action of said relay upon said power controlling means.

27. An automatic balancing mechanism comprising a source of power, operating means for balancing devices, power controlling means adapted to be shifted to effect the transmission of power from said source to said operating means in one direction or another, and a continuously reciprocating mechanical relay connected with said power controlling device to shift the same upon one reciprocation or the other according to its position and a standard of position governing the position of said relay in its reciprocation.

28. An automatic balancing mechanism comprising a source of power, operating means for balancing devices, power controlling means adapted to be shifted to effect the transmission of power thereto in one direction or the other, a relay for effecting the shifting of said power controlling means, a standard of position governing said relay, together with holding means acting on said power controlling means to hold the said means in the positions to which it is shifted independently of the relay.

29. An automatic balancing mechanism comprising a source of power, operating means for balancing devices, power controlling means adapted to be shifted to effect the transmission of power thereto in one direction or the other, a relay for effecting the shifting of said power controlling means, a standard of position governing said relay, together with locking means operating to hold the power controlling means in the positions to which it is shifted independently of the standard of position.

30. In an aircraft a movably mounted standard of position balanced as respects centrifugal forces acting upon its mass and having a determinate normal positional relation to the craft, balancing devices for the craft automatically controlled in their movements by said standard when the craft becomes unbalanced whereby said normal positional relation aforesaid is maintained, and steering means arranged to bank the craft for a turn-through operation of balancing devices when the steering means is operated.

31. In an aircraft a movably mounted standard of position balanced as respects centrifugal forces acting upon its mass and to have a determinate normal positional relation to the craft, balancing devices for the craft automatically controlled in their movements by said standard when the craft becomes unbalanced whereby the said normal positional relation is maintained, steering means for the craft, and connections between said steering means and said standard arranged to alter the normal positional relation of the same to the plane of the craft when the steering means is operated whereby the craft is banked for a turn.

32. A balancing system for aircraft comprising a power operated automatic balancing mechanism including a source of power, operating means for balancing devices, power controlling means to control the direction and continuity of the transmission of power from said source to said operating means, and a standard of position governing the said power controlling means; manually operable means for controlling the balancing devices; balancing devices for the craft; and a three point differential connection between the balancing devices on the one hand, and the operating means of the automatic balancing mechanism aforesaid, and the aforesaid manually operable controlling means on the other hand, together with means for locking and unlocking the manual control at will.

33. In an aircraft, a balancing system comprising an automatic balancing mechanism including a source of power, operating means adapted to be moved from said source of power to operate balancing devices, and a standard of position controlling the application of power from said source to said operating means, said operating means being normally positively locked in any position to which it is moved in response to the governing action of said standard of position, balancing devices for the aircraft, manually operable controlling means for said balancing devices, and three-point differential connection between said balancing devices on the one hand and said operating means of the automatic device and said manually operable controlling devices on the other, whereby operation of the balancing devices through said manually operable controlling means is without effect upon the position of said operating means of the automatic mechanism, and a cut-off device for said source of power operable independently of said standard of position.

34. In an aircraft, the balancing system comprising an automatic mechanism including a source of power, operating means adapted to be moved from said source of power to operate said balancing devices, a standard of position controlling the application of power from said source to said operating means, said operating means being normally positively locked in any position to which it is moved in response to the governing action of said standard of position, balancing devices for the aircraft manually operable controlling means for said balancing devices, a three point differential connection between said balancing devices on the one hand and said operating mechanism of the automatic device and said manually operable control devices on the other, means for locking the manual control at will, whereby the manual and the automatic controls may each operate independently and positively without affecting the other and whereby the movement of the balancing devices in all cases is proportional exactly to the movement of that one of the manual and automatic control which is exercised, and means for cutting the source of power on and off independently of said standard of position.

35. A balancing system for aircraft comprising an automatic means, including a source of power, operating means for balancing devices adapted to be driven from said source of power, a standard of position governing the application of power to said operating means from said source of power, said operating means being locked against movement when the source of power is cut off whereby the balancing devices are retained in approximately the positions to which they are operated irrespective of whether the source of power be cut off, balancing devices connected with said operating means, manually operable control means, also adapted to operate said balancing devices, cut-off means controlling the action of said source of power and arranged to be operated to terminate the operation of said automatic mechanism at will, together with means for locking and unlocking the manual control at will.

In testimony whereof I affix my signature in presence of two witnesses.

JOHN P. TARBOX.

Witnesses:
 N. CURTIS LAMMOND.
 N. E. COSTELLO.